Patented Mar. 2, 1954

2,671,060

UNITED STATES PATENT OFFICE 2,671,060

UNSATURATED ESTERS OF SUBSTITUTED CYCLOHEXANECARBOXYLIC ACIDS, POLYMERS THEREOF, AND COMPOSITIONS CONTAINING THE SAME

Rupert C. Morris, Berkeley, and Edward C. Shokal and Vernon W. Buls, Walnut Creek, Calif., assignors to Shell Development Company, San Francisco, Calif., a corporation of Delaware No Drawing. Application February 24, 1950,
Serial No. 146,162

19 Claims. (Cl. 260—17)

This invention relates to a new class of organic compounds. More particularly, the invention relates to novel unsaturated esters of substituted cyclohexanecarboxylic acids and polymers thereof, and to their utilization, particularly as additives for organic resinous compositions.

Specifically, the invention provides useful and valuable esters of cyclohexanecarboxylic acids having a tertiary alkyl radical substituted on the ring, preferably three carbon atoms removed from the ring carbon atom bearing the carboxyl group, and monohydric alcohols containing at least one polymerizable unsaturated linkage. The invention further provides polymers of these esters obtained by polymerizing the said esters with themselves or other polymerizable organic compounds. The invention also provides organic resinous compositions, particularly surface coating compositions, containing the said polymers.

It is an object of the invention to provide a new class of organic compounds. It is a further object to provide novel unsaturated esters of substituted cyclohexanecarboxylic acids and a method for their preparation. It is a further object to provide unsaturated esters of tertiary-alkyl substituted cyclohexanecarboxylic acids possessing unique properties which make them particularly useful and valuable in industry. It is a further object to provide polymers of the above-described unsaturated esters. It is a further object to provide polymers of the said unsaturated esters which are particularly valuable as additives for surface coating compositions. It is still a further object to provide coating compositions containing the said polymers which have many improved physical properties. It is a further object to provide coating composition containing cellulose derivatives which have improved hardness and resistance to water and alkali and outdoor exposure. It is a further object to provide improved coating compositions containing urea-aldehyde type resins. Other objects and advantages of the invention will be apparent from the following detailed description thereof.

It has now been discovered that these and other objects may be accomplished by esters of cyclohexanecarboxylic acids having a tertiary alkyl radical substituted on the ring, preferably three carbon atoms removed from the ring carbon atom bearing the carboxyl group, and monohydric alcohols containing at least one polymerizable unsaturated linkage, and polymers of these esters obtained by polymerizing the said esters with themselves or with other polymerizable unsaturated organic compounds. These esters and polymers have been found to have many unexpected beneficial properties which make them particularly useful and valuable in industry. The esters are useful, for example, as textile lubricants, lubricating oil additives, asphalt adhesive agents, water-proofing agents for silica-gel greases, pour point depressants, viscosity index improvers, and anti-foam agents. The esters are particularly valuable as softening agents and tackifiers for natural and synthetic organic polymeric materials, such as cellulose nitrate, cellulose acetate, and ethyl cellulose, the casein and other protein plastics, lignin plastics, synthetic linear polyamides, phenol-aldehyde type resins, urea-aldehyde type resins, and the like. They are especially valuable as plasticizers for vinyl-type polymers, such as polyvinyl chloride, and when used in this capacity produce plasticized compositions having excellent tensile strength and hardness and improved durability.

The polymers of the invention come under special consideration as they have been found to be outstanding additives for surface coating compositions, particularly those containing the amide-aldehyde type resins and the cellulose derivatives. The novel polymers are highly compatible with this type of material and when used, even in relatively small quantities, endow the resulting composition with improved physical properties. Films containing these polymers possess excellent hardness and strength and unexpectedly high resistance to water, alkalies and outdoor exposure.

The acids used in producing the novel esters of the invention comprise the saturated monocarboxylic acids containing a ring of six carbon atoms and having one carbon atom of the said ring joined to a carboxyl group and another one, preferably three carbon atoms removed therefrom, joined to a tertiary alkyl radical. For brevity, these acids will be referred to generically throughout the specification and claims as "tert-alkyl substituted cyclohexanecarboxylic acids." These acids may be either of the cis or trans form. The ring containing the carboxyl group and the tert-alkyl radical may be further substituted if desired with non-interfering substituents, such as short chain alkyl radicals, halogen atoms, alkoxy radicals, and the like. The expression "tertiary alkyl radical" as used throughout the specification and claims refers in a generic sense to those alkyl radicals containing at least one quaternary carbon atom in their chain, preferably not more than four carbon atoms removed from the free bond of the radical. The more preferred tertiary alkyl radicals are those containing a single quaternary carbon atom joined to three short chain alkyl radicals and to the radical bearing the free bond. Examples of the tertiary alkyl radicals are tert-butyl, tert-amyl, tert-hexyl, tert-octyl, 2,2-diethylbutyl, 3,3-ditert-butyl amyl, 3,3-diisopropyl-butyl and the like.

Examples of the above-described acids are 3-tert-butylcyclohexanecarboxylic acid, 4-tert-hexylcyclohexanecarboxylic acid, 2-chloro-3-tert-butylcyclohexanecarboxylic acid, 2,3-dibromo-4-tert-butylcyclohexanecarboxylic acid, 2-methyl-5-tert-butylcyclohexanecarboxylic acid, 3,5-dichloro-4-tert-heptylcyclohexanecarboxylic acid, 5-(2,2'-diethylbutyl) cyclohexanecarboxylic acid, 2-cyano-4-tert-butylcyclohexanecarboxylic acid, 2-nitro-4-tert-octylcyclohexanecarboxylic acid, and the like.

Preferred acids to be used in producing the novel esters are the 4-tert-alkyl substituted cyclohexanecarboxylic acids containing from 11 to 20 carbon atoms and preferably having from four to nine carbon atoms in the said tert-alkyl radical. Examples of these preferred acids are 2-ethyl-4-tert-butylcyclohexanecarboxylic acid, 2,3-dichloro-4-tert-hexylcyclohexanecarboxylic acid, 5-cyano-4-tert-butylcyclohexanecarboxylic acid, 3-butyl-4-tert-butylcyclohexanecarboxylic acid, 2,5 - diethyl - 4 - tert - butylcyclohexanecarboxylic acid.

Coming under special consideration are the saturated monocarboxylic acids containing a ring of six carbon atoms and having one carbon atom of the said ring joined to a hydrogen atom and a carboxyl group, another ring carbon atom three carbon atoms removed therefrom joined to a hydrogen atom and a tert-alkyl radical, and the remaining ring carbon atoms joined to members of the group consisting of hydrogen, halogen and straight chain alkyl radicals, preferably containing from 1 to 4 carbon atoms.

The alcohols used in producing the novel esters are the monohydric alcohols containing at least one polymerizable unsaturated linkage, e. g., an ethylenic linkage, preferably not more than four carbon atoms removed from the terminal hydroxyl group. The alcohols may be substituted with aliphatic, alicyclic, aromatic or heterocyclic radicals. They may contain oxygen or sulfur ether linkages and may be further substituted with non-interfering substituents, such as halogen atoms, alkoxy radicals and the like.

One group of the above-described unsaturated alcohols are the alpha, beta-ethylenically unsaturated alcohols which are sometimes referred to as "vinyl-type" alcohols. Many of these alcohols have never been isolated and require special methods, described hereinafter, for the preparation of their esters. These alcohols may be exemplified by vinyl alcohol, 1-isopropenol, 1-hexenol, 1-butenol, 3-chlorobuten-1-ol, 3-bromohexen-1-ol and 3-ethylcyclopenten-1-ol and the like.

Another group of the unsaturated alcohols are the beta, gamma-ethylenically unsaturated alcohols. These alcohols are often referred to as "allyl-type" alcohols. They may be exemplified by allyl alcohol, crotyl alcohol, tiglyl alcohol, 3-chloro-2-butenol, cinnamyl alcohol, 2,4-hexadienol, 2-methyl-2-hexenol, 5-chloro-2-octenol, 3-cyclohexyl-2-octenol, 4-phenyl-2-heptenol, 2,4-dichloro-2-hexenol, 2-cyclohexenol, and 3-ethyl-2-octenol.

Still another group of the unsaturated alcohols are those monohydric alcohols containing a triple bond in the beta, gamma-positions, such as propargyl, 2-pentynol, 4-chloro-2-hexynol and the like.

Particularly preferred unsaturated alcohols to be used in producing the novel esters of the invention are the alpha, beta-ethylenically unsaturated aliphatic monohydric alcohols containing from 2 to 15 carbon atoms, and the beta, gamma-ethylenically unsaturated aliphatic monohydric alcohols containing from 3 to 18 carbon atoms. Examples of these preferred alcohols are vinyl alcohol, allyl alcohol, 2-hexenol, 2-chloro-2-hexenol, 1-pentenol, 3-chloro-2-octenol, 3,5-dibutyl-2-decenol, 3-butyl-1-octenol, and the like. Of special interest are the 1-alkenols containing from 2 to 8 carbon atoms and the 2-alkenols containing from 3 to 12 carbon atoms.

The novel esters of the invention are obtained by esterifying any one of the above-described acids with any one of the above-described alcohols. Examples of such esters are vinyl 3-tert-butylcyclohexanecarboxylate, allyl 4-tert-amylcyclohexanecarboxylate, 2-hexenyl 4-tert-heptylcyclohexanecarboxylate, 2-chloro-1-pentenyl 4-tert-hexylcyclohexanecarboxylate, vinyl 3-tert-octylcyclohexanecarboxylate, allyl 2,5-dichloro-4-tert-butylcyclohexanecarboxylate, methallyl 3-ethyl-4-tert-butylcyclohexanecarboxylate, 3-butyl-1-octenyl 4-tert-amylcyclohexanecarboxylate, 3-phenyl-2-hexenyl 4-tert-octylcyclohexanecarboxylate, vinyl 4-tert-heptylcyclohexanecarboxylate, and allyl 3-cyano-4-tert-butylcyclohexanecarboxylate.

The preferred esters, i. e., those prepared from the preferred acids and preferred alcohols, may be exemplified by vinyl 4-tert-butylcyclohexanecarboxylate, allyl 4-tert-amylcyclohexanecarboxylate, methallyl 4-tert-heptylcyclohexanecarboxylate, chloroallyl 4-tert-octylcyclohexanecarboxylate, 2-hexenyl 4-tert-butylcyclohexanecarboxylate, and 2-heptenyl 3-chloro-4-tert-butylcyclohexanecarboxylate.

The above-described esters may be prepared by a variety of methods. Some of the esters may be prepared, for example, by direct esterification of the acid with the unsaturated alcohol, while others may be prepared by reacting the alcohol with an acid chloride in pyridine or by an ester-exchange reaction.

As indicated above, many of the vinyl-type alcohols cannot be isolated and special methods must be employed in producing esters of these alcohols. One of the preferred methods for producing esters of these vinyl alcohols is to react the desired acid with acetylene in the presence of a mercuric salt, such as mercuric sulfate. A more detailed description of this process may be found in U. S. Patent No. 1,084,581. Another preferred method comprises reacting the desired acid with a previously formed vinyl ester, such as vinyl acetate, in the presence of an ester-exchange catalyst. A more detailed description of this method may be found in U. S. Patent No. 2,245,131. Still other methods consist of treating a vinyl-type halide with the sodium or silver salt of the desired acid.

The esters other than the vinyl-type esters are preferably prepared by a direct esterification process wherein the acid and alcohol are reacted in the presence of a catalyst and the water formed in the reaction removed, preferably by distillation. Catalysts utilized in this reaction may be exemplified by p-toluenesulfonic acid, ethylsulfonic acid, benzenesulfonic acid, hydrobromic acid, chloroacetic acid, sulfuric acid, formic acid, boron and silicon fluorides, acid salts, such as monosodium sulfate, and salts of strong acids and weak bases, such as zinc chloride, and zinc sulfate and the like. The amount of the catalyst employed will vary over a wide range depending upon the particular type of reactants, type of catalyst selected and reaction conditions employed. In most cases, the amount of the catalyst will vary from 0.1% to 5% by weight of the reactants.

The esterification may be accomplished in the presence or absence of solvents or diluents. In case solvents or diluents are employed, organic compounds, such as benzene, toluene, cyclohexane, xylene, and mixtures thereof, which do not interfere with the reaction, are generally preferred.

It is also desirable in some cases to accomplish the esterification in the presence of a polymerization inhibitor, such as copper bronze powder, sulfur, p-phenylenediamine, hydroquinone, tannic acid and various amino and sulfur compounds. These inhibitors may be subsequently removed by washing, distillation, extraction, and the like.

The temperature employed in the esterification may vary over a considerable range. In general, temperatures varying between about 50° C. to 150° C. may be utilized. Preferred temperatures range from about 80° C. to 125° C. Atmospheric, superatmospheric, or subatmospheric pressures may be employed as desired or necessary.

The esters may be recovered from the reaction mixture by any suitable means, such as extraction, distillation, fractional precipitation, and the like.

The novel esters of the invention may be readily polymerized with themselves or with one or more other polymerizable unsaturated monomers to produce useful and valuable polymeric materials. One group of polymerizable unsaturated monomers to be polymerized with the said esters are those containing a single ethylenic linkage, such as styrene, alpha-methylstyrene, dichlorostyrene, vinyl naphthalene, vinyl phenol, acrylic acid and the alpha-alkyl substituted acrylic acids; the esters of these unsaturated acids, such as methyl acrylate, methyl methacrylate, butyl methacrylate, and propyl acrylate; the vinylidene halides, such as vinylidene chloride, vinylidene bromide and vinylidene fluoride; the vinyl esters of the inorganic acids, such as the halogen acids and hydrocyanic acid, such as vinyl chloride, vinyl bromide, acrylonitrile, and methacrylonitrile; the vinyl esters of the monocarboxylic acids, such as vinyl acetate, vinyl chloroacetate, vinyl benzoate, allyl propionate and vinyl caproate.

Another particularly important group of monomers to be copolymerized with the said esters are those having a conjugated system of ethylenic double bonds, such as 1,3-butadiene, isoprene, 2,3-dimethyl-1,3-butadiene, piperylene, 2-chloro-3-methyl-1,3-butadiene, 2-cyano-1,3-butadiene, 2-methoxy-1,3-butadiene, and 2-fluoro-1,3-butadiene. The copolymers prepared with these materials may be mixed with sulfur, carbon black, metallic oxides and vulcanization accelerators in standard rubber processing equipment and cured to vulcanizates having many improved properties.

Some of the other important copolymerizable monomers are those having two or more polymerizable non-conjugated double bonds. An important subclass consists of the unsaturated aliphatic polyesters of saturated polybasic acids, such as divinyl, diallyl, and dimethallyl esters of oxalic, malonic, citric and tartaric acids. Another subclass consists of the unsaturated aliphatic polyethers of saturated polyhydric alcohols, such as divinyl, diallyl and dimethallyl ethers of glycol, diethylene glycol, trimethylene glycol, and similar derivatives of glycerol, mannitol, sorbitol, and the like. Still another subclass consists of the unsaturated aliphatic organic acid polyesters of polyhydric alcohols, such as acrylic and methacrylic polyesters of glycol. Still another class consists of the unsaturated polyesters of dibasic aromatic acids, such as divinyl, diallyl and dimethallyl esters of phthalic acid, isophthalic acid, and the naphthalene dicarboxylic acids.

The proportions to be used in producing the novel copolymers will vary over a wide range depending upon the specific reactants and the type of product desired. Copolymers having improved hardness and resistance to water may be obtained when the amount of the unsaturated ester of the tertalkylcyclohexanecarboxylic acids is maintained between 10% to 98% of the total reactants and the added monomers between 90% and 2%. Copolymers having exceptionally fine durability properties are obtained when the amount of the unsaturated esters of the invention is maintained between 98% to 50% of the total reactants and the added monomer between 2% and 50%.

The polymerization may be accomplished by any suitable method. It is preferably accomplished by heating the desired monomer or monomers in the presence of a polymerization catalyst. This polymerization may be effected in bulk, in the presence of solvents, or in an aqueous emulsion or suspension. If solvents are employed, they may be solvents for the monomers and polymer, or they may be a solvent for the monomers and non-solvent for the polymer. Examples of solvents that may be utilized in the polymerization reaction are benzene, toluene, cumene, cyclohexane, acetone, dioxane, and the like, and mixtures thereof.

Catalysts that may be used may be exemplified by benzoyl peroxide, benzoyl acetyl peroxide, tertiary-butyl hydroperoxide, 2,2-bis-(tertiary-butyl peroxy) butane, tertiary-butyl perbenzoate, cumene hydroperoxide, tertiary-butyl peracetate, tertiary-butyl pelargonate, and the like, and mixtures thereof. The amount of the catalyst added may vary over a considerable range. In general, the amount will vary from 0.1% to 5% by weight of the material being polymerized. Preferred amounts vary from 1% to 2% by weight. If desired, air may be dispersed through the reaction mixture to act as a catalyst in effecting the polymerization.

The temperature employed in the polymerization may vary over a considerable range depending upon the material being polymerized, catalyst selected, etc. In most cases, the temperature will vary from 50° C. to about 300° C. Preferred temperatures range from 100° C. to 200° C. Atmospheric, superatmospheric or subatmospheric pressures may be utilized. In those cases where the operating temperature is above the boiling point of the polymerization mixture, it is desirable to use superatmospheric pressures at least equal to the autogenic pressure.

The polymerization may be carried to completion without substantial interruption or it may be stopped at any point short of completion. Incomplete polymerization may be used for the production of syrup which may be further worked and eventually substantially completely polymerized.

The unreacted materials may be separated from the polymer by any suitable method, such as solvent extraction, distillation, filtration, and the like. The separated polymer may then be worked up in any known or special manner.

As indicated, the novel polymers of the invention are particularly suitable for use as components for surface coating compositions. The polymers are especially valuable as additives for compositions containing amide-aldehyde type resins, cellulose derivatives, vinyl-type polymers and natural drying oils. The expression "amide-aldehyde type resin" is used throughout the specification and claims to refer in a generic sense to the resinous products obtained by condensing aldehydes with amides. Such resins are sometimes referred to as "aminoplasts." Aldehydes used in producing this type of resin may be exemplified by formaldehyde or compounds engendering formaldehyde (e. g. paraformaldehyde, hexamethylene tetramine, etc.), acetaldehyde, propionaldehyde, butyraldehyde, acrolein, methacrolein, crotonaldehyde, benzaldehyde, furfural, etc., mixtures thereof, or mixtures of formaldehyde with or materials yielding formaldehyde such aldehydes. The amides used in producing the said resins may be exemplified by urea, thiourea, diurea, hydroxy urea, ethanol urea, unsymmetrical diphenyl urea, diethylene triurea, methyl urea, acetyl urea, phenyl thiourea, asymmetrical diethyl urea, methylene ureas, dicyandiamide, and the like.

The vinyl-type polymers that may be combined with the novel polymers of the invention in producing the improved surface coating compositions comprise the homopolymers, copolymers and interpolymers of the vinyl-type monomers, i. e., those monomers containing at least one $CH_2=C=$ group in their molecule. Examples of these monomers are styrene, alpha-methyl-styrene, dichlorostyrene, vinyl naphthalene, vinyl phenol, acrylic acid and the alpha-alkyl substituted acrylic acids; the esters of these unsaturated acids, such as methyl acrylate, methyl methacrylate, butyl methacrylate, and propyl acrylate; the vinylidene halides, such as vinylidene chloride, vinylidene bromide and vinylidene fluoride; the vinyl esters of the inorganic acids, such as the halogen acids and hydrocyanic acid, as vinyl chloride, vinyl bromide, acrylonitrile, and methacrylonitrile; the vinyl esters of the monocarboxylic acids, such as vinyl acetate, vinyl chloroacetate, vinyl benzoate, vinyl valerate, and vinyl caproate; the vinyl esters of the polycarboxylic acids, such as divinyl succinate, divinyl adipate, vinyl allyl phthalate, vinyl methyl glutarate; the vinyl esters of the unsaturated acids, such as vinyl acrylate, vinyl crotonate, and vinyl methacrylate.

Preferred vinyl-type polymers to be combined with the novel polymers are the vinyl halide polymers. The expression "vinyl halide polymer" is used throughout the specification and claims to refer to polymers containing a predominant quantity, i. e., at least 60% by weight of a vinyl halide, such as vinyl chloride and vinyl bromide. Examples of these polymers are polyvinyl chloride, copolymers of vinyl chloride and vinyl acetate, copolymers of vinyl chloride, and vinylidene chloride, and copolymers of vinyl chloride and diethyl fumarate.

The novel polymers are especially valuable as additives for coating compositions containing cellulose derivatives. Such derivatives may be exemplified by cellulose nitrate, cellulose acetate, cellulose acetate butyrate, cellulose propionate, cellulose isobutyrate, cellulose crotonate, cellulose stearate, and cellulose valerate; ethyl cellulose, methyl cellulose, butyl cellulose, benzyl cellulose, glycol cellulose, cellulose acetostearate, cellulose acetopropionate, cellulose acetotartarate, and the like, and mixtures thereof.

The preferred cellulose derivative to be used with the novel polymers is nitrocellulose. Various grades of nitrocellulose may be employed. Ordinarily, R. S. ½ sec. nitrocellulose will be used, although lower viscosity grades like R. S. ¼ sec. or higher viscosity grades like R. S. 6 sec. may be employed if desired. The established standard of viscosity grade for nitrocellulose is explained in ASTM test D301-33.

A single polymer of the invention may be added to the above described film-forming materials or solutions thereof, or a mixture of two or more of the said polymers may be utilized. The amount of the polymer or polymers to be added will vary over a considerable range depending upon the type of film-forming material, intended use of the finished product, etc. In general, 1 part to 300 parts of polymer will be used for every 100 parts of film-forming material. Ordinarily, in the production of coating compositions, such as lacquers, the amount of the polymer added will vary from 25 parts to 150 parts.

In the preparation of coating compositions, the polymer and film-forming material are combined together in a liquid vehicle which is usually employed in the preparation of such coatings, such as ethyl acetate, isopropyl acetate, n-butyl acetate, methyl ethyl ketone, isobutyl ketone, acetone, ethylene glycol ethyl ether, toluene, xylene, ethyl alcohol, isopropyl alcohol, n-butyl alcohol, methyl isobutyl alcohol, various petroleum fractions, and the like, and mixtures thereof. The amount of the vehicle employed will vary over a wide range depending chiefly upon the viscosity desired in the finished solution. In general, amounts of vehicle varying from 5% to 95% of the total solids content are usually satisfactory.

Other materials, such as plasticizers like dibutyl phthalate, dioctyl phthalate, tricresyl phosphate, and the like, as well as additives, such as kopal, kauri, damar, ester gums, and the like, may also be added. If colored compositions are desired, pigments and coloring materials, such as titanium pigments, may be incorporated in appropriate amounts.

The coating compositions of the present invention are superior to many of the coatings now available in industry. The compositions form clear finishings having excellent hardness, good gloss and superior resistance to water and alkalies and outdoor exposure. Coating compositions in appropriate solvents may be applied to substantially any surface, such as steel or metal either primed or unprimed by spraying, brushing or other methods. The solvents may be evaporated at room temperature but in many cases it is preferred to bake the coatings by application of infra-red rays or in a suitable oven. In the latter case, very high temperatures may be used without discoloring or causing decomposition of the coating.

The coating compositions of the invention may also be used to impregnate fabrics and fibrous materials to impart rigidity thereto or to laminate wood or fabrics of cotton or glass fibers. It is also feasible to introduce the compositions into or to apply it to fibers, such as wood flour employed in the preparation of molding powders, To illustrate the manner in which the invention may be carried out, the following examples are given. It is to be understood, however, that the examples are for the purpose of illustration and the invention is not to be regarded as limited to any of the specific conditions cited therein. Unless otherwise specified, parts disclosed in the following examples are parts by weight.

*Example I*

About 384 parts of 4-tert-butylcyclohexanecarboxylic acid was mixed with 140 parts of allyl alcohol, 150 parts of toluene and 3 parts of p-toluenesulfonic acid and the resulting mixture heated under reflux. The water formed during the reaction was removed by azeotropic distillation with the toluene. After the reaction was complete, the mixture was distilled to produce allyl 4-tert-butylcyclohexanecarboxylate, a colorless mobile liquid having the following physical properties: Boiling point 123° C. (3 mm.), $n$ 20/D 1.463(8), $d$ 20/4 0.9403.

*Example II*

About 200 parts of 4-tert-butylcyclohexanecarboxylic acid was mixed with 380 parts of vinyl acetate (inhibited with hydroquinone), 3.5 parts of mercuric acetate, and 0.5 part of concentrated sulfuric acid and the resulting mixture heated under reflux. When the reaction was complete, the mixture was cooled, filtered, washed with water and fractionated to produce vinyl 4-tert-butylcyclohexanecarboxylate, a colorless liquid having the following physical properties: Boiling point 88.5–90.0° C. at 1.2 to 2.7 mm.; ester value, eq./100 g., found 0.50(9), theory 0.49.

Esters having related properties are obtained by substituting equivalent amounts of each of the following esters for vinyl acetate in the above-described process: 1-hexenyl acetate, 1-butenyl acetate, and 4-bromo-1-heptenyl propionate.

*Example III*

About 395 parts of 4-tert-amylcyclohexanecarboxylic acid is mixed with 140 parts of allyl alcohol, 150 parts of toluene and 3 parts of p-toluenesulfonic acid and the resulting mixture heated under reflux, the water formed in the reaction being removed as an azeotrope. After the reaction is complete, the mixture is distilled to produce allyl 4-tert-amyl cyclohexanecarboxylate, a colorless mobile liquid.

*Example IV*

About 384 parts of 3-tert-butylcyclohexanecarboxylic acid is mixed with 160 parts of methallyl alcohol, 150 parts of toluene and 3 parts of p-toluenesulfonic acid and the resulting mixture heated under reflux, the water formed in the reaction being removed as an azeotrope. After the reaction is complete, the mixture is distilled to produce methallyl 3-tert-butylcyclohexanecarboxylate, a colorless, mobile liquid.

Esters having related properties are obtained by substituting equivalent amounts of each of the following alcohols for the said methallyl alcohol in the above-described process; chloroallyl alcohol, 2-hexenol, 3,5-diethylheptenol, 3-cyclohexyl-2-hexenol, and 4-bromo-2-octenol.

*Example V*

The allyl 4-tert-butylcyclohexanecarboxylate produced in Example I was mixed with 2 parts of di-tert-butyl peroxide and the mixture heated at 130° C. for a short period. At the end of the heating period, the mixture was distilled to remove the unreacted monomer and catalyst decomposition product. The resulting product was a soft, colorless solid. The polymer was readily soluble in acetone, benzene and organic esters and was highly compatible with nitrocellulose.

*Example VI*

About 100 parts of the vinyl 4-tert-butylcyclohexanecarboxylate produced in Example II was mixed with 300 parts of xylene and .5 part of di-tertiary butyl peroxide and the mixture heated at 138–148° C. After one, two and three hours polymerization time additional .5 part of peroxide was added to total 2 parts of the peroxide. At the end of 5 hours heating, 95% of the monomer was converted to a polymer. By distilling off the unpolymerized monomer at 150° C. (0.5 mm.) a light yellow resin resulted having a Durran's softening point of 131° C.

Polymers having related properties are obtained by substituting equivalent amounts of each of the following esters in the above-described process: 1-hexenyl 4-tert-butylcyclohexanecarboxylate, 3-chloro-1-pentenyl 4-tert-butylcyclohexanecarboxylate, and 1-butenyl 4-tert-butylcyclohexanecarboxylate.

*Example VII*

The allyl 4-tert-amylcyclohexanecarboxylate produced in Example III was mixed with 2 parts of di-tert-butyl peroxide and the mixture heated at 130° C. The unreacted monomer was removed by distillation as shown in the preceding example. The resulting product was a soft, colorless solid.

*Example VIII*

About 60 parts of allyl 4-tert-amylcyclohexanecarboxylate is mixed with 40 parts of allyl propionate and 2 parts of di-tert-butyl peroxide and the resulting mixture heated at 130° C. The unreacted monomers and catalyst decomposition products are then removed by distillation. The resulting product is a soft solid copolymer having good solubility in organic solvents.

Copolymers having related properties are obtained by substituting equivalent amount of each of the following esters for the allyl propionate in the above-described process: methyl acrylate, butyl acrylate, cyclohexyl methacrylate, vinyl butyrate, and methacrylonitrile.

*Example IX*

About 75 parts of allyl 4-tert-butylcyclohexanecarboxylate is mixed with 25 parts of diallyl phthalate and 2 parts of di-tert-butyl peroxide and the resulting mixture heated at 130° C. The unreacted monomers and catalyst decomposition products are then removed by distillation. The resulting product is a hard solid resin.

Copolymers having related properties are obtained by substituting equivalent amounts of each of the following esters for diallyl phthalate in the above-described process: diallyl maleate, diallyl succinate, dimethallyl adipate.

*Example X*

About 90 parts of allyl 4-tert-butylcyclohexanecarboxylate was mixed with 10 parts of styrene and 1 part of di-tert-butyl peroxide and heated at 120° C. for twenty-four hours. The unreacted monomer was removed by distillation as shown in the preceding examples. The resulting product was a light colored polymer having a slight tackiness.

Copolymers having similar properties were obtained by repeating the experiment and replacing the styrene with 10 parts of vinyl acetate and 10 parts of methyl methacrylate, respectively.

*Example XI*

A coating composition was prepared by mixing 1 part of nitrocellulose, 1 part of poly(allyl 4-tert-butylcyclohexanecarboxylate) and 0.2 part of dibutyl phthalate with a solvent comprising 19% V n-butyl acetate, 12% V n-butanol, 30% V toluene and 20% V petroleum lacquer solvent to form a solution having about 30% solids. Films of this solution were cast on steel panels and dried at 80° C. for 2 hours. At the end of this period, the films were very hard and flexible and had excellent resistance to water and outdoor exposure.

*Example XII*

The superior hardness of the nitrocellulose films containing the novel polymers of the invention is shown in the following tests. Lacquers were prepared containing one part of polymer shown in the table below per part of R. S. ½ sec. nitrocellulose in a solvent consisting of 56% n-butyl acetate, 4% ethyl alcohol and 40% xylene. Films of these lacquers were cast on glass panels, forced dried two hours at 80° C. and then allowed to stand at room temperature. The films were then tested for hardness. The results are indicated in the table below:

| Polymer Added to Nitrocellulose | Sward Hardness Seven Days after Casting |
|---|---|
| Commercial non-drying alkyd (Rezyl 99) | 55 |
| Poly(allyl propionate) | 40 |
| Poly(allyl 4-tert-butyl cyclohexanecarboxylate) | 77 |

*Example XIII*

The excellent water resistance of the nitrocellulose films containing the novel polymers of the invention is shown in the following tests. Lacquers were prepared containing one part of resin shown in the table below per part of R. S. ½ sec. nitrocellulose in a solvent consisting of 56% n-butyl acetate, 4% ethyl alcohol and 40% xylene. The solids content of the lacquers was approximately 15%. These lacquers were sprayed on steel panels using successive coatings until the dried film had a thickness of one mil. The coated panels were dried at room temperature and humidity for 11 days and then placed in distilled water according to the procedure shown in ASTM ES-35. The panels were inspected at the end of 168 or 169 hours. The results are indicated in the following table:

| Polymer added to nitrocellulose | Test Period, hrs. | Condition of Film at end of Test | Appearance after 24 hours recovery |
|---|---|---|---|
| Commercial non-drying alkyd (Rezyl 99). | 168 | slight whitening. | still slight whitening. |
| Poly(allyl benzoate) | 169 | do | Do. |
| Poly(allyl 4-tert-butyl-cyclohexanecarboxylate). | 169 | no whitening | no whitening. |

We claim as our invention:

1. Vinyl 4-tert-butylcyclohexanecarboxylate.
2. Allyl 4-tert-butylcyclohexanecarboxylate.
3. Methallyl 4-tert-butylcyclohexanecarboxylate.
4. Allyl 4-tert-amylcyclohexanecarboxylate.
5. A 2-alkenyl 4-tert-alkylcyclohexanecarboxylate.
6. An ester of a 4-tert-alkylcyclohexanecarboxylic acid and a beta,gamma-monoethylenically unsaturated aliphatic monohydric alcohol containing from 3 to 18 carbon atoms.
7. An ester of a 4-tert-alkylcyclohexanecarboxylic acid and an alpha,beta-monoethylenically unsaturated aliphatic monohydric alcohol containing from 2 to 15 carbon atoms.
8. An ester of a saturated monocarboxylic acid containing a single ring of six carbon atoms and having one carbon atom of the said ring joined to a carboxyl group and another ring carbon atom joined to a tertiary alkyl radical, and a monohydric alcohol containing at least one polymerizable unsaturated linkage.
9. Polymerized vinyl 4-tert-butylcyclohexanecarboxylate.
10. Polymerized allyl 4-tert-butylcyclohexanecarboxylate.
11. A polymer of a 2-alkenyl 4-tert-alkylcyclohexanecarboxylate.
12. A composition comprising the product of polymerization of a mixture containing 10% to 98% by weight of allyl 4-tert-alkylcyclohexanecarboxylate and 90% to 2% by weight of diallyl phthalate.
13. A composition comprising the product of polymerization of a mixture containing 10% to 98% by weight of allyl 4-tert-alkylcyclohexanecarboxylate and 90% to 2% by weight of styrene.
14. A composition comprising the product of polymerization of a mixture containing 10% to 90% by weight of a 2-alkenyl-4-tert-alkylcyclohexanecarboxylate and 90% to 2% by weight of a polymerizable unsaturated monomer containing at least one $CH_2=C=$ group.
15. A polymer of an ester of a saturated monocarboxylic acid containing a single ring of six carbon atoms and having one carbon atom of the said ring joined to a carboxyl group and another ring carbon atom joined to a tertiary alkyl radical, and a monohydric alcohol containing at least one polymerizable unsaturated linkage.
16. A composition comprising 100 parts of nitrocellulose and 10 parts to 300 parts of polymerized allyl 4-tert-butylcyclohexanecarboxylate.
17. A composition comprising 100 parts of nitrocellulose and 10 parts to 300 parts of a polymerized ester of a 4-tert-alkylcyclohexanecarboxylic acid and a beta,gamma-monoethylenically unsaturated aliphatic monohydric alcohol containing from 3 to 18 carbon atoms.
18. A composition comprising nitrocellulose and a polymer defined in claim 14.
19. A composition comprising (1) nitrocellulose, and (2) a polymer additive defined in claim 15.

RUPERT C. MORRIS.
EDWARD C. SHOKAL.
VERNON W. BULS.

References Cited in the file of this patent

UNITED STATES PATENTS

| Number | Name | Date |
|---|---|---|
| 2,200,437 | Voss et al. | May 14, 1940 |
| 2,482,606 | Adelson et al. | Sept. 20, 1949 |

OTHER REFERENCES

Arnold et al., J. Am. Chem. Soc. 64, 2875–2877 December 1942.